June 19, 1934. A. TSCHERNE 1,963,599

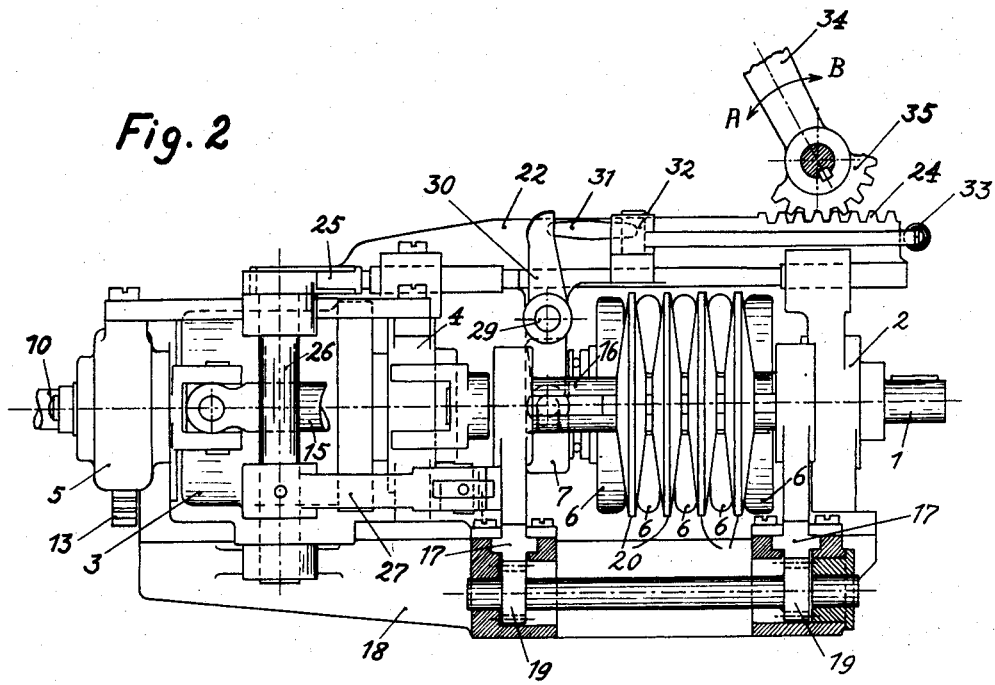
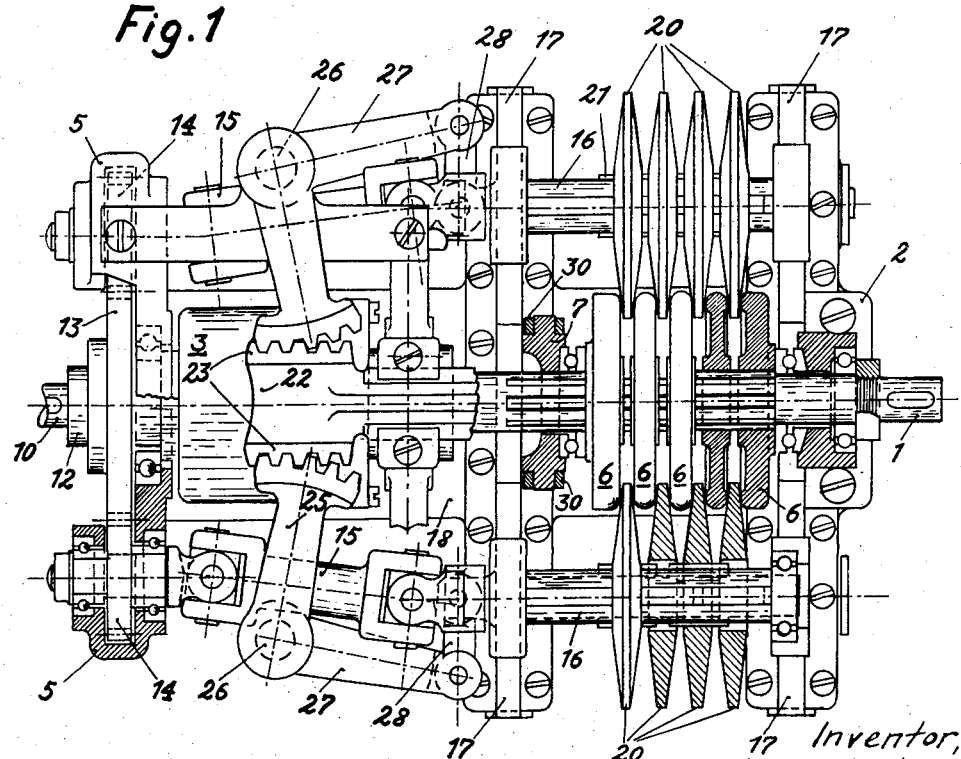

DIFFERENTIAL CHANGE SPEED GEAR

Filed June 7, 1932 2 Sheets-Sheet 2

Inventor
Alois Tscherne,
By Oscar A. Geier
Attorney

UNITED STATES PATENT OFFICE 1,963,599

DIFFERENTIAL CHANGE-SPEED GEAR

Alois Tscherne, Rorschach, Switzerland

Application June 7, 1932, Serial No. 615,803
In Germany June 11, 1931

3 Claims. (Cl. 74—26)

Change-speed gears having friction wheels, conical rollers, balls etc., are known which permit of the regulation of the number of revolutions of the lay-shaft during the rotation or functioning of the gear. However, owing to the fact that these gears have to be made comparatively large for the transmission of high power and consequently take up a good deal of space and are heavy, they are not suitable for ordinary use, for instance for fitting in vehicles, machines, etc.

To overcome the above-mentioned disadvantages of the known types of gears, a gear has been designed in accordance with the present invention, the size and weight of which are extremely small, as a result of the new method of arranging the driving members, and which can consequently be used for all trade purposes. As a result of the flat and compact construction of the gear and the great transmission power obtained by the new form of the power transmission elements, the gear is especially suitable for all kinds of vehicles.

Figure 3:
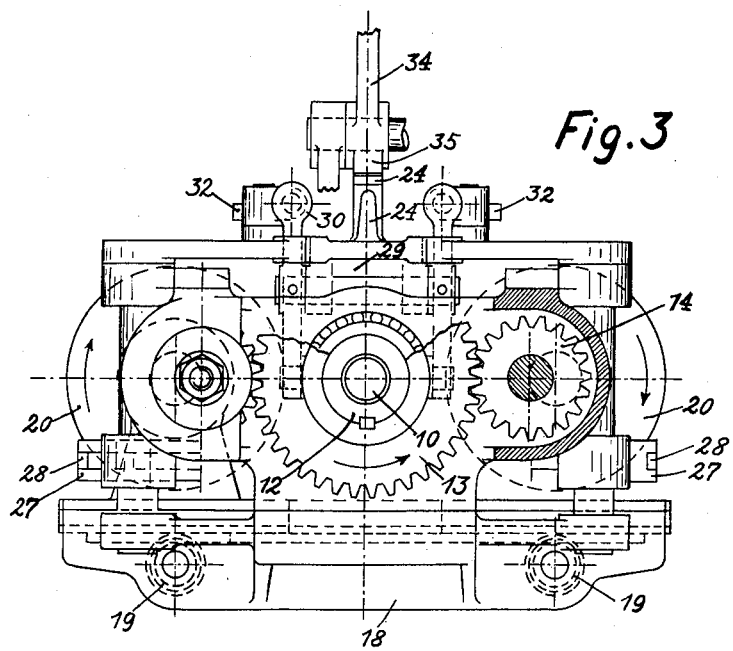
Figure 4:
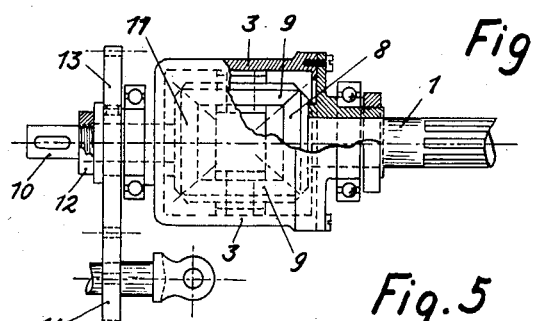

An embodiment of the object of the invention is shown in the accompanying drawings, in which Figure 1 is a horizontal section;
Figure 2 is a longitudinal section;
Figure 3 a transverse section;
Figure 4 a detail section, and
Figure 5 a diagrammatic representation of the process of regulation and the method of operating the gear.

A driving shaft 1 is disposed in a bearing support 2 and in a casing 3, which itself is mounted in a rotatable manner in bearing supports 4 and 5. On this driving shaft 1 are mounted a number (five in the embodiment shown) of discs 6 which always rotate with the said shaft but are displaceable axially along it. These discs 6 are formed with a driving rim adapted for the transmission of movement or rotation. Upon the last of these discs presses a thrust bearing. On the extremity of the driving shaft 1 in the casing 3 is disposed a bevel wheel 8 which engages with two bevel wheels 9 mounted in the surrounding casing 3. The driven shaft 10 is also fitted in the casing 3, on the extremity of which shaft is disposed a bevel wheel 11 which engages the bevel wheels 9. To an outer spindle bush 12 of the casing 3 is firmly secured a spur wheel 13 with which two pinions 14 engage, said pinions 14 being mounted in the bearing support 5. The wheel 13 has twice as many teeth as the pinions 14. To the spindle of the pinions 14 are connected universally jointed shafts 15 which are connected at the other end with the knuckle pins of two shafts 16. The bearing supports carrying the shafts 16 are arranged in a movable manner by means of slides 17 in the frame or plate 18, which has corresponding guides. To ensure an absolutely parallel displacement of the shafts 16, the bottom part of the slide 17 is in the form of a rack, and in the frame 18 are disposed two shafts, each of which has two pinions 19 which engage with the rack of the slide 17, so that the two bearing supports of each shaft 16 are displaced in an absolutely uniform manner. On the shafts 16 are fitted wedge-shaped discs 20 which are connected by splines 21 with the shafts 16 but are displaceable on them in an axial direction. These discs 20 engage between the discs 6 on the shaft 1. The upper part of the two bearing supports 2 and 4 are in the form of guides, in which is disposed a slide 22, which is provided on both sides of one extremity with teeth 23 and at the other extremity with teeth 24. Two toothed segments 25 engage with the teeth 23. Each of these toothed segments 25 is mounted upon a shaft 26, on which is disposed a lever 27, to the extremity of which is connected a shackle 28. The other extremity of this shackle 28 is connected to one of the slides 17 or to the corresponding bearing supports. To the slide 22 are connected by bolts 29 two levers 30, the one extremity of which presses against the thrust ring 7 and the other extremity is formed in the shape of a socket. In this socket is disposed a pressure pin 31. The other extremity of this pressure pin 31 rests in ball sockets on two levers 32, also connected to the slide 22. The outer extremities of these two levers are connected by a tension spring 33. By means of a lever 34 which is provided with a toothed segment 35, engaging in the teeth 24, of the slide 22, this slide 22 can be displaced.

The method of functioning of the differential change-speed gear represented is as follows—

The adjustment shown in Figure 1 corresponds to a gear ratio between the driving shaft 1 and the driven shaft 10 of 1:0 i. e. the shaft 1 rotates with a certain number of revolutions and the shaft 10 remains stationary. This is the case when the effective radii of the discs 6 and of the discs 20 are the same. The shaft 10 is stationary by virtue of the following—The discs 20 are driven at the same number of revolutions by the disc 6; the shafts 16, and with them the pinions 14, rotate with the same number of revolutions as the shaft 1. By the pinions 14 acting through the spur wheel 13 the casing 3 is driven in the same direction of rotation but with half the number of revolutions as the shaft 1. The bevel wheels 9 are driven by the bevel wheel 8 at half the speed, and their speed of rotation round their own axis, as they rotate with the casing, allows them to roll over the bevel wheel 11 when this is stationary.

Figure 5:
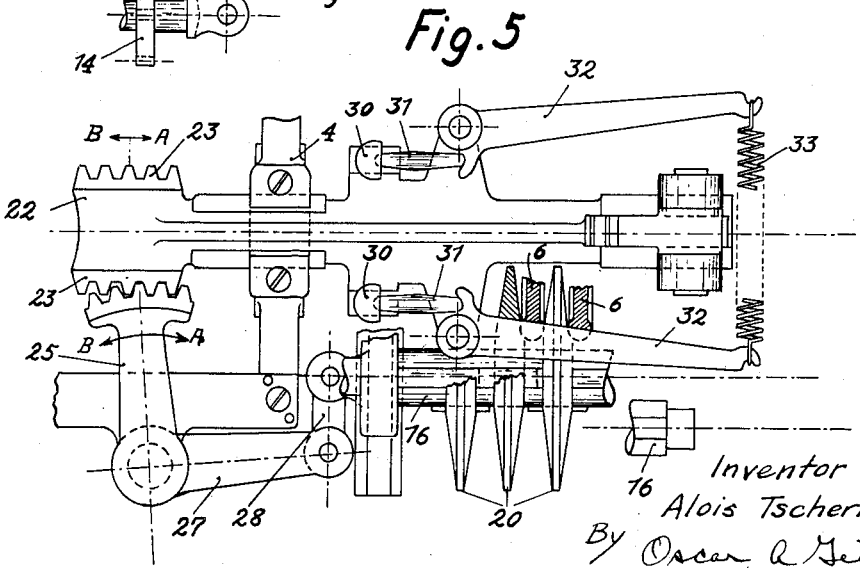

If the lever 34 is now oscillated in the direction of the arrow B, the slide 22 is displaced and with it, by means of the toothed segments 25, the levers 27 and the shackles 28, the bearing supports of the shafts 16 are displaced in the guides in the frame 12. The shafts 16 are displaced in a parallel direction with respect to the shaft 1 and the effective radii of the discs 20 are reduced. In Figure 5 a position is shown in which the effective radius of the discs 20 is half that of the discs 6. In this position the discs 20 are driven by the discs 6 with double the number of revolutions. The casing 3 thus receives the same number of revolutions as the shaft 1. The bevel wheels 9 do not rotate round their own axes and thus take with them the bevel wheel 11 at the same number of revolutions as the shaft 1 and the casing 3. The gear ratio between the shaft 1 and the shaft 10 is consequently 1:1.

If, on the other hand, the lever 34 is oscillated away from the position first described and in the direction of the arrow A, the effective radius of the discs 20, in consequence of the movement of the shafts 16 away from the shaft 1 will thereby be increased and will be larger than the effective radius of the disc 6. This results in a backward drive of the shaft 10 in relation to the shaft 1, i. e. its number of revolutions is equal to the difference between the number of revolutions of the shaft 1 and of the casing 3.

To facilitate the regulation of the speed of the layshaft of the gear, the adjusting and pressure devices which function together with the discs 6 and 20 and are correspondingly formed are of importance. By virtue of the spring 33, acting through the levers 32, the pressure pins 31 and the levers 29, the thrust ring 7 is pressed against the discs 6, so that the axially displaceable discs 6 and 20 engage firmly against each other. The transmission of the motion of all the toothed segments and levers connected with each other is arranged in such a manner that the discs 20, in consequence of their wedge-shaped cross-sections, try to escape from the axial pressure produced by the spring 33 along the shaft 1, from which it is carried back or transmitted to the slide 22 by means of the levers 27 and toothed segments 25. As the toothed segments 25 now act against the direction of pressure of the slide 22 (the power introduced into the toothed segments 25 acts in the direction A and the slide 22 owing to the tension effect of the spring 33 in the direction of B Figure 5), the resultant pressure effects of the discs 20 and of the slide 22 are nullified. It can, therefore, be readily understood that the gear can easily be regulated while running for the purpose of altering the number of revolutions.

Having now described my invention, what I claim and desire to secure by Letters Patent is:—

1. Differential change speed gear comprising in combination a drive shaft, friction drive discs fast upon and movable axially of the drive shaft, secondary shafts arranged parallel to and on both sides of the drive shaft, friction discs fast upon and movable axially of the secondary shafts, slides on which the secondary shafts are mounted, and a common actuating gear for uniformly moving said slides towards and away from the drive shaft so as to displace said secondary shafts at right angles to the drive shaft, said actuating gear comprising a toothed actuating slide and toothed segments engaging said toothed slide and operatively connected with the slides of the secondary shafts.

2. Differential change speed gear comprising in combination a drive shaft, friction drive discs fast upon and movable axially of the drive shaft, secondary shafts arranged parallel to and on both sides of the drive shaft, friction discs fast upon and movable axially of the secondary shafts, bearings for the secondary shafts, slides on which the bearings of the respective secondary shafts are mounted, means for uniformly moving said slides towards and away from the drive shaft so that the discs on the secondary shafts are frictionally driven and the effective radii thereof is varied, a common actuating gear for transmitting motion to the means moving the slides, said actuating gear comprising a toothed adjustable slide, toothed segments engaging said toothed slide, levers connected at their one ends with said toothed segments and shackles rotatably connecting the free ends of said levers to the bearings of the respective slides.

3. Differential change speed gear comprising in combination a drive shaft, friction drive discs fast upon and movable axially of the drive shaft, secondary shafts arranged parallel to and on both sides of the drive shaft, friction discs fast upon and movable axially of the secondary shafts, bearings for the secondary shafts, slides on which the bearings of the respective secondary shafts are mounted, means for uniformly moving said slides towards and away from the drive shaft so that the discs on the secondary shafts are frictionally driven and the effective radii thereof is varied, a common actuating gear for transmitting motion to the means moving the slides, said actuating gear comprising a toothed adjustable slide, toothed segments engaging said toothed slide, levers connected at their one ends with said toothed segments, shackles rotatably connecting the free ends of said levers to the bearings of the respective slides, secondary levers disposed on said slides and a spring connecting said secondary levers.

ALOIS TSCHERNE.